US006678472B2

(12) United States Patent
Pavicsits

(10) Patent No.: US 6,678,472 B2
(45) Date of Patent: Jan. 13, 2004

(54) CAMERA

(75) Inventor: Bernhard Pavicsits, Ebergassing (AT)

(73) Assignee: Lomographische AG, Vienna (AT)

( * ) Notice: Subject to any disclaimer, the term of this patent is extended or adjusted under 35 U.S.C. 154(b) by 0 days.

(21) Appl. No.: 10/344,520

(22) PCT Filed: Aug. 13, 2001

(86) PCT No.: PCT/AT01/00267

§ 371 (c)(1),
(2), (4) Date: Feb. 12, 2003

(87) PCT Pub. No.: WO02/14945

PCT Pub. Date: Feb. 21, 2002

(65) Prior Publication Data

US 2003/0175026 A1 Sep. 18, 2003

(30) Foreign Application Priority Data

Aug. 14, 2000 (AT) .......................................... 1400/2000

(51) Int. Cl.[7] .................................................. G03B 1/00
(52) U.S. Cl. .......................... 396/387; 396/401; 396/411
(58) Field of Search ........................... 396/6, 205, 304,
396/387, 401, 411, 412, 443, 37

(56) References Cited

U.S. PATENT DOCUMENTS 3,426,663 A 2/1969 Fox
3,866,602 A 2/1975 Furihata
3,917,386 A 11/1975 Swales
4,038,977 A 8/1977 Okada
4,164,333 A 8/1979 Hosaka
4,194,825 A * 3/1980 Fauth .......................... 396/412
4,211,479 A 7/1980 Zawodny
4,350,425 A 9/1982 Hackenberg
4,690,534 A 9/1987 Chen-Liang
6,006,036 A * 12/1999 Douglas ......................... 396/6

FOREIGN PATENT DOCUMENTS

DE 19522742 A1 1/1997

* cited by examiner

*Primary Examiner*—David Gray
(74) *Attorney, Agent, or Firm*—Wenderoth, Lind & Ponack, L.L.P.

(57) ABSTRACT

A camera having a transport device for stepwise transport of a film in each case by the length of a respective picture, wherein the transport device includes a film take-up shaft which is driven by way of a winding reel on which a pull element, preferably a cord, is wound, on which film take-up shaft the film can be wound from a film supply spool, in particular from an inserted film cartridge, wherein the free end of the pull element (2) projects into the open through an opening in the housing (17) of the camera and the film (14) is transported stepwise by the length of a picture by pulling on the pull element (2), wherein the winding reel (8) is adapted for automatically winding on the pull element (2) after transport of the film (14) by the length of a picture.

16 Claims, 3 Drawing Sheets

CAMERA

Figure 1:
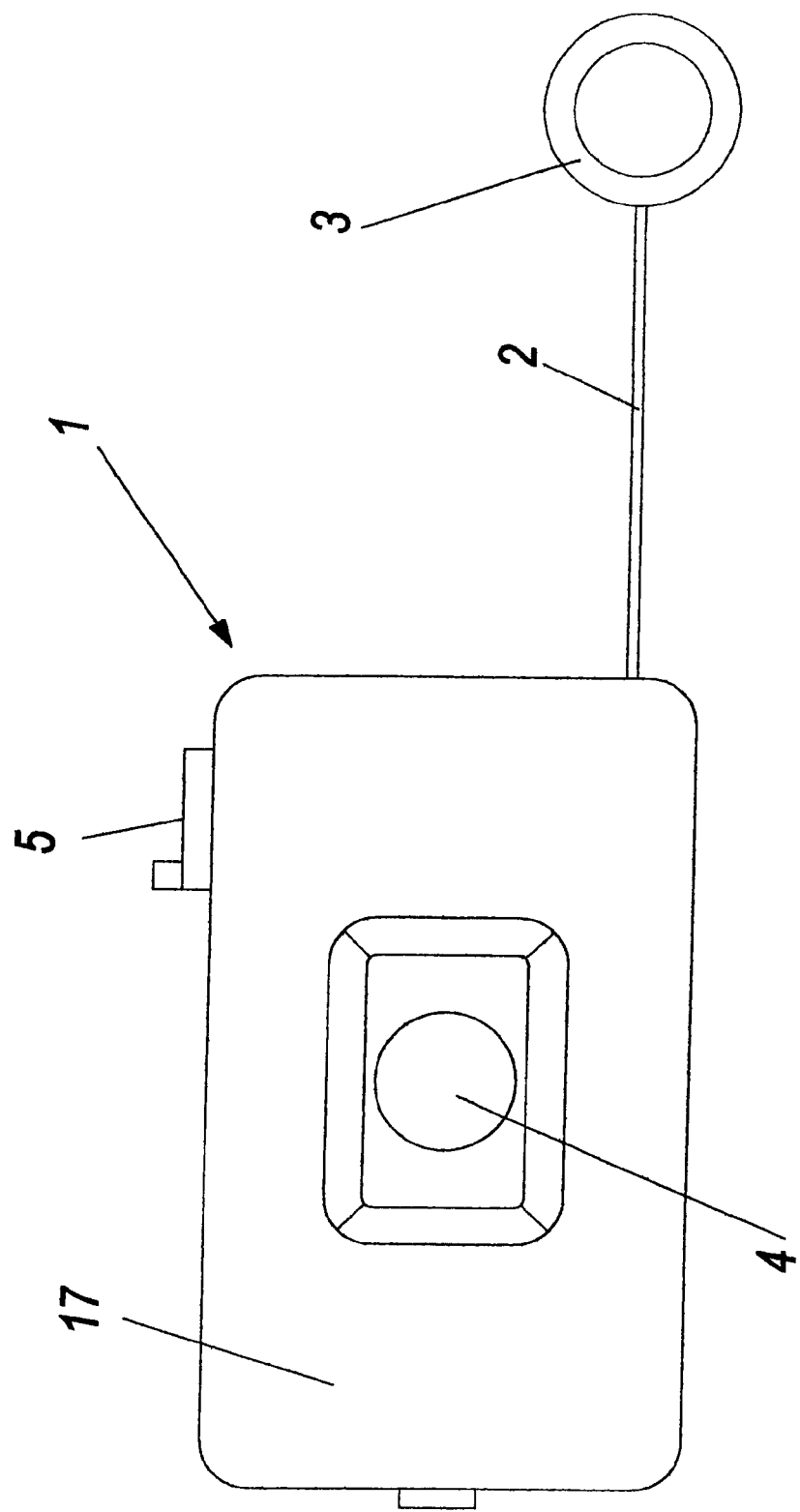

The invention concerns a camera having a transport device for stepwise transport of a film in each case by the length of a respective picture, wherein the transport device includes a film take-up shaft which is driven by way of a winding reel on which a pull element, preferably a cord, is wound, on which film take-up shaft the film can be wound from a film supply spool, in particular from an inserted film cartridge.

In photographic cameras it is usual for the film strip which is rolled up in a condition of being protected from light in film cartridges to be transported with a stepwise movement out of the film cartridge past an exposure window onto a film take-up shaft. In the known cameras transportation of the film is usually effected by manual actuation of a winding wheel or a winding lever or by means of an electric motor.

Thus, U.S. Pat. No. 3,426,663 discloses an endoscope camera in which transportation of the film is effected by way of a bottom cable arrangement including an actuating lever. It is also known from U.S. Pat. No. 4,164,333 in relation to an endoscope camera for the film to be advanced by means of a pull element which passes outwardly along an endoscope, wherein the free end of the pull element is connected to a winding wheel mounted on the endoscope so that transportation of the film is effected by a rotary movement at that winding wheel. Both U.S. Pat. No. 3,866,602 and U.S. Pat. No. 4,038,977 describe transport devices in endoscope cameras in which the film is transported with a stepwise movement.

The object of the invention is to provide a novel camera which has a transport mechanism which is simple to operate.

In accordance with the invention that is attained in that the free end of the pull element projects into the open through an opening in the housing of the camera and the film is transported stepwise by the length of a picture by pulling on the pull element, wherein the winding reel is adapted for automatically winding on the pull element after transport of the film by the length of a picture.

In a camera of such a design configuration therefore, between the individual exposures, film transport is effected over the length of a picture by pulling on a pull element, for example a cord. In that respect, the term length of a picture is used to denote the film advance between two exposures, namely the sum of the length of the exposed negative (for example 36 mm) and the usual intermediate space between the exposed negatives.

German patent specification DE 195 22 742 admittedly discloses a photographic camera in which, prior to exposure of the film strip, the entire film strip is wound onto the film winding-on spool in one pull from the film cartridge by pulling on a cord which is wound on a drum connected to the film winding-on reel, and the cord is removed from the camera after the winding-on operation has been effected. That camera however does not involve stepwise transport of the film by way of a cord between the exposures. That is effected in that case—as is usual—by way of a hand wheel.

The camera according to the invention is preferably in the form of a disposable camera which is already fitted with a photographic film by the camera manufacturer and which, after exposure thereof, together with the film strip, is sent to a developing laboratory for development of the film. As the cord is wound onto the winding reel again after each film winding-on operation, the length of the cord does not need to correspond to the length of a film—a 24×36 mm film is about 90 cm long. It is sufficient if the cord is of such a length that it can transport the film by the length of a picture, for example 36 mm plus the spacing between negatives.

In order to make handling of the camera according to the invention as simple as possible for the user, a further advantageous embodiment of the invention can provide that a holding element, for example a ring, is arranged at the free end of the cord.

Figure 2:
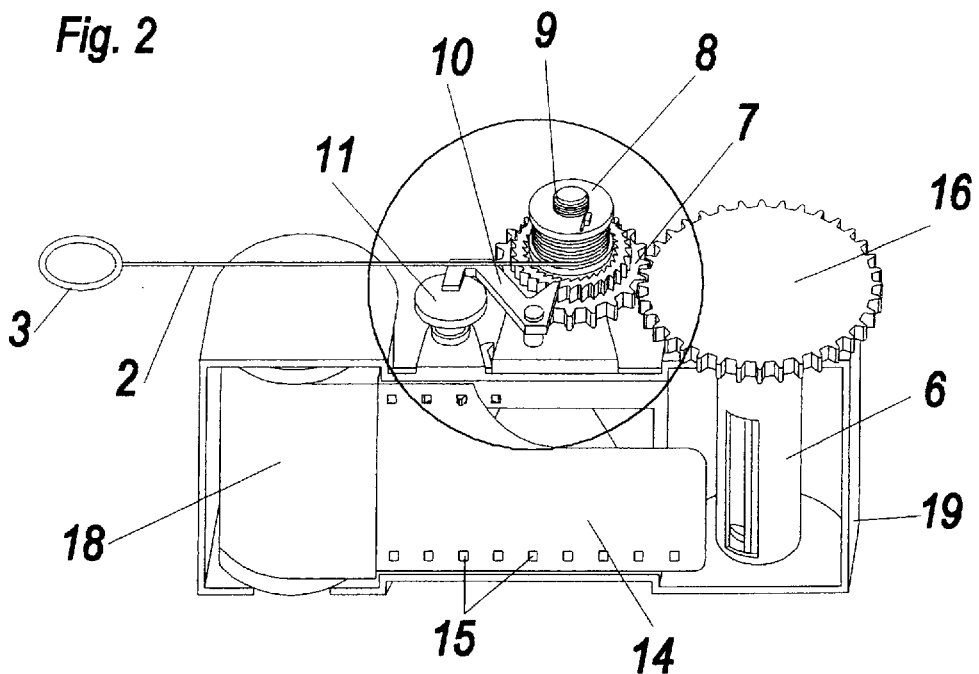
Figure 3:
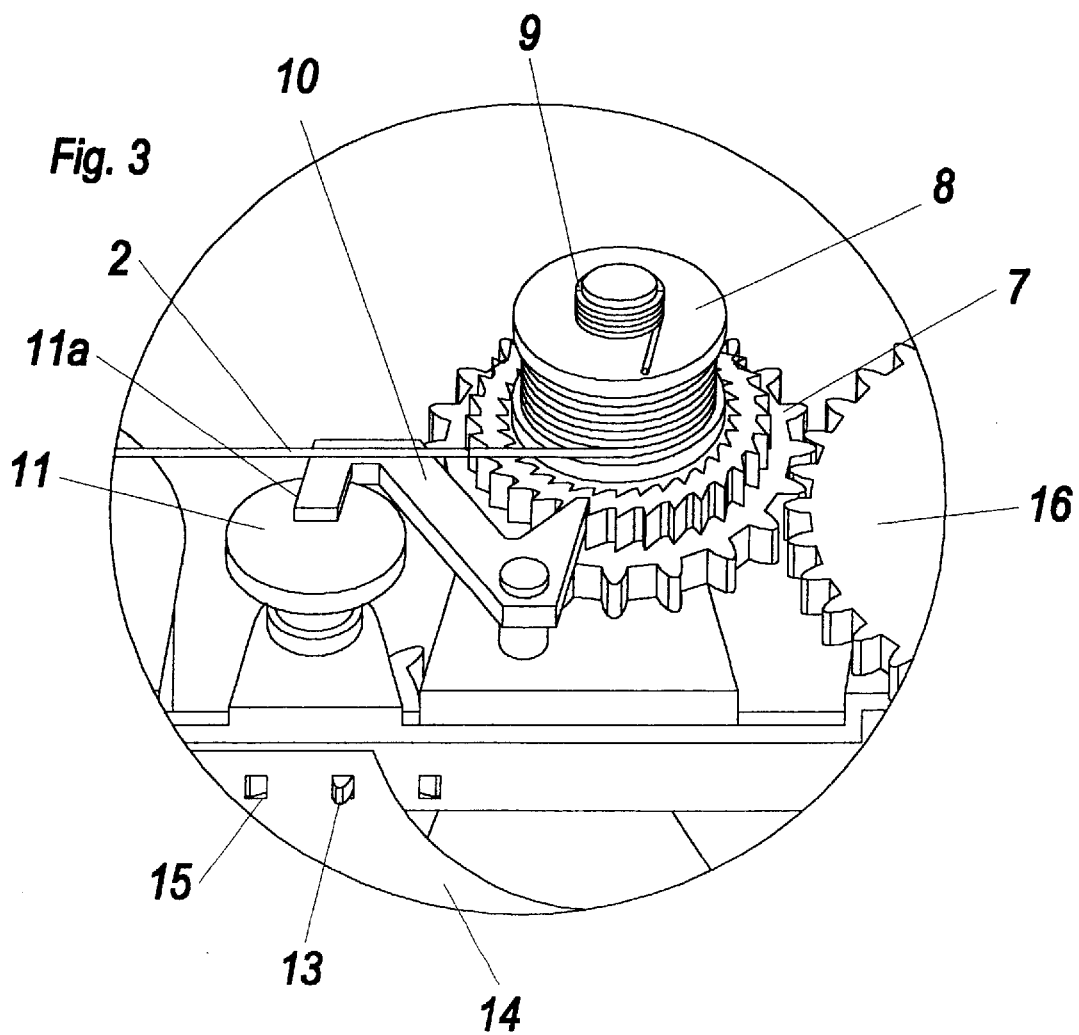
Figure 4:
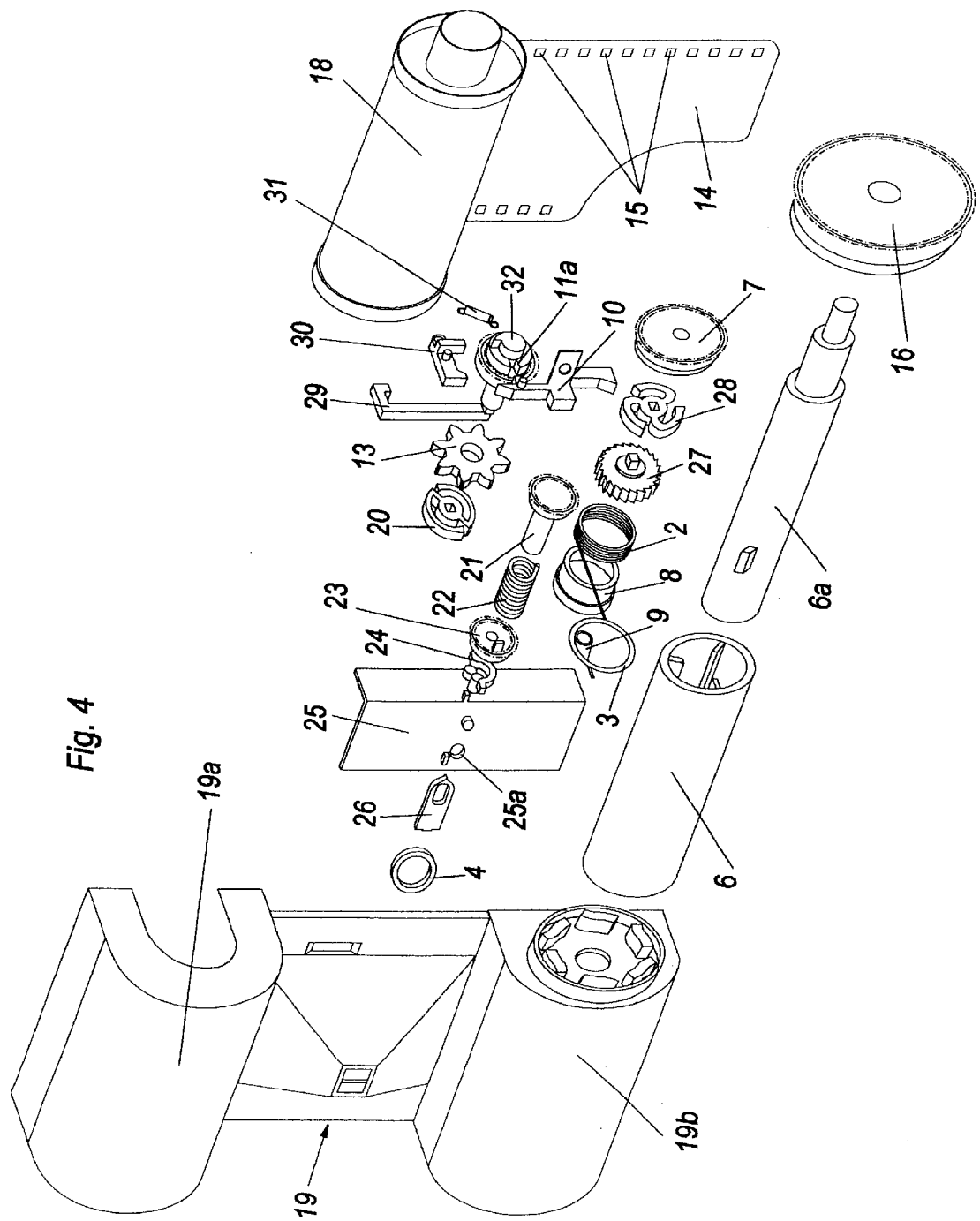

Further advantages and details of the invention will be described in greater detail with reference to the specific description hereinafter. In the drawing:

FIG. 1 is a front view in functionally diagrammatic form of the subject of the invention, FIG. 2 is a perspective view of the device for transporting a film strip of the invention, FIG. 3 shows a view on an enlarged scale of the part indicated at A in FIG. 2, and FIG. 4 shows an exploded view of a further embodiment.

FIG. 1 diagrammatically shows a front view of the camera 1 according to the invention, on the housing 17 of which is arranged a winding knob 5, beside the lens 4. The winding knob 5 serves to rewind the film strip which, after exposure, has been completely wound onto the film take-up shaft. Projecting laterally out of the housing 17 is the free end of a cord 2 which serves as a pull element and on which is mounted a holding element 3 in the form of a ring to provide for better handling. The opening (not shown) out of which the cord 2 which can be made from the most widely varying flexible materials such as for example plastic material or natural fiber projects into the open is desirably light-tightly closed by suitable means. If the camera is a disposable camera, the operation of rewinding the film which has been wound onto the film take-up shaft can also be effected in the dark room of a developing laboratory so that the provision of a winding knob on the housing is not absolutely necessary. A further possible way of rewinding the film is described in greater detail hereinafter.

In the case of the device shown in FIGS. 2 and 3 for the stepwise transport of a film strip 14 from a film supply spool 16 onto a film take-up shaft 6, the cord 2, at the free end of which is arranged a holding element 3, is wound with its other end onto a winding reel 8. The winding reel 8 at which a return spring 9 is arranged drives the drive wheel 7. The drive wheel 7 in turn engages into the gear 16 which is non-rotatably connected to the film take-up shaft 6 so that, when the winding reel 8 is rotated by pulling on the cord 2, the film take-up shaft 6 is caused to rotate by way of the drive wheel 7 and in that way the film 14 is wound onto the winding shaft 6. A locking lever 10 additionally engages into the drive wheel 7, wherein the locking lever 10 is connected to the counting wheel 13 by way of an eccentric shaft 11.

The mode of operation of the camera according to the invention will now be described with reference to the portion A shown in FIG. 3. By pulling on the cord 2, the winding reel 8 is caused to perform a rotary movement. The drive wheel 7 is also caused to rotate by way of the freewheel entrainment means (not shown) mounted on the winding reel 8. The drive wheel 7 subsequently drives the film take-up shaft 6 by way of the gear 16. In that way film 14 is pulled out of the film supply spool 18 and entrains the counting wheel 13 which engages into perforations 15 in the film 14. After a full revolution of the counting wheel 13, which precisely corresponds to the length of a picture, the drive wheel 7 is blocked by way of an eccentric shaft 11 with an opening 11a and a locking lever 10. When the cord 2 is released, the cord is retracted into the camera housing 17 by virtue of the return spring 9 which is tensioned on the winding reel 8, and the cord is wound onto the winding reel 8 again. After exposure has taken place, by again pulling on the cord, the film can be transported by a further picture.

The exploded view shown in FIG. 4 illustrates another embodiment of a camera according to the invention. In the assembled condition the illustrated parts are fixed substantially in or on the main body 19 of plastic material. The film cartridge 18 is disposed in the receiving means 19a while the film take-up shaft 6 is arranged in the oppositely disposed part 19b. The take-up shaft 6 is driven by an internal shaft 6a by the gear 16, wherein the film passes behind the aperture with the lens 4, as is generally usual in cameras. What is novel is the drive for the gear 16 and therewith the film take-up shaft 6. More specifically this is not effected as in the state of the art by means of a winding lever, by directly driving the gear 16 with the thumb or by motor means, but by way of a special cable pull mechanism.

The cable pull mechanism includes a winding reel 8, on which is wound a cable 2 with a ring 3 fixed at the end. The winding reel 8 is spring-loaded by a return spring 9 which, after release of the cord 2 which has been pulled out, winds it onto the winding shaft again. The winding shaft, by way of the coupling gear 27 and the freewheel 28, drives the gear 7 which in the installed condition is in engagement with the gear 16. The freewheel has resilient toothed arms which engage into an internal tooth configuration in the drive wheel 7, more specifically only in the direction in which the cord 2 is pulled out. When the cord 2 moves in (being wound on the winding reel 8 by the return spring 9) the freewheel 28 rotates freely with respect to the drive wheel 7.

So that picture transport is effected in each case only by a desired amount when a pulling force is applied to the cord 2, the device has a locking lever 10 which, in this embodiment, engages into the teeth of the coupling wheel 27 as soon as the film has been transported by the full length of a picture. After exposure has taken place that lever 10 is released again, in which case the shutter release 29 or a member secured thereto pivots the lever 10 out of the groove 11a in the member 11, in a manner not shown herein.

The lever 10 is controlled by way of the lever 30 which moves along the eccentric member 32 and is connected to the locking lever 10 by way of a locking lever spring 31. The disk 11 and the eccentric member 32 are driven by the "counting wheel" 13 which engages into the perforations 15 in the film. Overall therefore the last-described components represent a device for detecting the film advance movement. When the film advance movement has taken place to such an extent that the counting wheel 13 and therewith the members 11 and 32 have rotated through precisely one revolution, winding-on is blocked by way of the lever 30, the locking lever spring 31 and the locking lever 10, until the next exposure is effected by actuating the shutter release. As already mentioned, the shutter release releases the locking lever and therewith the winding-on mechanism.

The counting wheel 13, by way of a freewheel 20, also drives the shutter mechanism which is described hereinafter. The shutter mechanism includes a connecting wheel 21, by way of which a stressing spring 22 for the shutter is driven. The spring 22 acts on the shutter wheel 23 which is initially blocked. By actuation of the shutter release, the shutter wheel 23 is released in a manner not shown in detail herein and rotates rapidly under the force of the spring 22. That movement is transmitted by way of the shutter lever 24 to the actual shutter 26 which thus briefly opens the aperture 25a in the shutter plate 25. Overall therefore pulling on the cord not only implements film transportation but also, indirectly by way of the counting wheel, stressing of the shutter.

If the invention has been described by reference to this specific embodiment by way of example, It will be appreciated that modifications and means which are suitable for carrying the concept of the invention into effect can certainly be envisaged and are within the scope of the invention. Thus for example the winding reel could be arranged directly on the film take-up shaft. It would equally be possible to lock the freewheel of the spring-loaded winding reel and thus to provide that the film is rewound from the film take-up shaft into the film supply spool by way of the return spring.

What is claimed is:

1. A camera having a transport device for stepwise transport of a film in each case by the length of a respective picture, wherein the transport device includes a film take-up shaft which is driven by way of a winding reel on which a pull element is wound, on which film take-up shaft the film can be wound from a film supply spool, wherein the free end of the pull element projects into the open through an opening in a housing of the camera and the film is transported stepwise by the length of a picture by pulling on the pull element, the winding reel being adapted for automatically winding on the pull element after transport of the film by the length of a picture.

2. The camera as set forth in claim 1, wherein the pull element is a cord.

3. The camera as set forth in claim 1 the winding reel drives the film take-up shaft by way of a transmission including gears or a slipping clutch.

4. The camera as set forth in claim 3 wherein the winding reel drives a drive gear which is in engagement with a gear which is non-rotatably connected to the film take-up shaft.

5. The camera as set forth in claim 1 characterized by a device for detecting the film transport distance and a locking means of the film transport device, which is controlled in dependence on said detection device and which locks the film transport until the next exposure as soon as the film transport distance precisely corresponds to the length of a picture.

6. The camera as set forth in claim 5 wherein the device for detecting the film transport distance actuates a counting wheel engaging into the film perforations and an eccentric shaft or the like which is driven thereby and which actuates a locking lever.

7. The camera as set forth in claim 6 wherein the locking lever engages the film take-up shaft, a member non-rotatably connected thereto or the transmission means between the film take-up shaft and the winding reel, in particular the drive gear.

8. The camera as set forth in claim 1 wherein the winding reel is spring-loaded by a return spring.

9. The camera as set forth in claim 1 wherein the winding reel is connected to the film take-up shaft or the drive wheel in freewheeling relationship in the direction opposite to the pulling direction of the pull element.

10. The camera as set forth in claim 1 characterized in that a holding element is arranged at the free end of the pull element.

11. The camera as set forth in claim 10 wherein the holding element is a ring.

12. The camera as set forth in claim 1 characterized by an optical display means for displaying the conclusion of film transport by the length of a picture after pulling on the pull element.

13. The camera as set forth in claim 1 wherein the winding reel which is rotated by pulling on the pull element stresses a spring-loaded shutter device for actuating a shutter closing at least one aperture, which after actuation of a shutter release briefly opens the aperture(s) film exposure.

14. The camera as set forth in claim 13 wherein the film which is transported by the winding reel over the film take-up shaft drives a gear which is in engagement with the film perforations and which stresses the spring-loaded shutter device.

15. The camera as set forth in claim 1 wherein it is a disposable camera.

16. A method of transporting a film in a camera wherein by pulling on a pull element a winding reel is rotated and at the same time a return spring thereof is stressed, the film is moved by the length of a picture and wound onto the film take-up shaft drivingly connected to the winding reel, and, when the pull element is released, the spring-loaded winding reel returns to the starting position, the pull element being wound onto the winding reel again.

* * * * *